United States Patent
Bernal et al.

(10) Patent No.: US 10,262,328 B2
(45) Date of Patent: Apr. 16, 2019

(54) SYSTEM AND METHOD FOR VIDEO-BASED DETECTION OF DRIVE-OFFS AND WALK-OFFS IN VEHICULAR AND PEDESTRIAN QUEUES

(71) Applicant: Conduent Business Services, LLC, Dallas, TX (US)

(72) Inventors: Edgar A. Bernal, Webster, NY (US); Qun Li, Webster, NY (US); Robert P. Loce, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 288 days.

(21) Appl. No.: 14/279,652

(22) Filed: May 16, 2014

(65) Prior Publication Data

US 2015/0310458 A1    Oct. 29, 2015

Related U.S. Application Data

(60) Provisional application No. 61/984,398, filed on Apr. 25, 2014.

(51) Int. Cl.
*G06Q 50/12* (2012.01)
*G06Q 30/02* (2012.01)
*G06K 9/00* (2006.01)

(52) U.S. Cl.
CPC ..... *G06Q 30/0201* (2013.01); *G06K 9/00778* (2013.01); *G06K 9/00798* (2013.01); *G06Q 50/12* (2013.01)

(58) Field of Classification Search
CPC .... G06Q 30/02; G06Q 30/0261; G06Q 30/06; G06Q 30/0238; G06Q 50/12; G06K 9/00771; G06K 9/00798; G06K 9/00369; G06K 9/6215; G06K 9/00288; G06K 9/00281; G06K 9/00302; G06K 9/6218; G06K 9/00718; G06K 2009/00738; G06K 9/00778; G06K 9/00785; G08G 1/167; G08G 1/20; G06T 2207/10016; G06T 2207/30256; G06T 7/11;
(Continued)

(56) References Cited

U.S. PATENT DOCUMENTS

| | | | | |
|---|---|---|---|---|
| 5,097,328 A * | 3/1992 | Boyette | ............... | G06Q 10/06 348/150 |
| 8,009,203 B2 * | 8/2011 | An | ...................... | H04N 5/232 348/222.1 |

(Continued)

OTHER PUBLICATIONS

Preventive Maintenance Drive Thru Solutions, R.F. Technologies, Inc., www.rftechno.com.

*Primary Examiner* — Andrew M Moyer
*Assistant Examiner* — Dennis Rosario
(74) *Attorney, Agent, or Firm* — Fay Sharpe LLP (57) ABSTRACT

A system and method for detecting customer drive-off/walk-off from a customer queue. An embodiment includes acquiring images of a retail establishment, said images including at least a portion of a customer queue region, determining a queue configuration within the images, analyzing the images to detect entry of a customer into the customer queue, tracking a customer detected in the customer queue as the customer progresses within the queue, analyzing the images to detect if the customer leaves the customer queue, and generating a drive-off notification if a customer leaves the queue.

22 Claims, 4 Drawing Sheets

(58) Field of Classification Search
CPC ............. G06T 2207/30241; G06T 7/20; G06T 2207/30232; G06T 2207/30236; G06T 7/292; G06F 19/24
See application file for complete search history.

(56) References Cited

U.S. PATENT DOCUMENTS

| | | | |
|---|---|---|---|
| 8,107,676 B2 * | 1/2012 | Senior .................. | G06K 9/00771 382/103 |
| 8,134,596 B2 * | 3/2012 | Lei ..................... | G06K 9/00369 348/169 |
| 8,254,625 B2 | 8/2012 | Coulter et al. | |
| 8,811,671 B2 * | 8/2014 | Nakao .................. | G06K 9/4642 382/103 |
| 9,426,627 B1 * | 8/2016 | Logan .................. | H04W 4/028 |
| 2004/0260513 A1 | 12/2004 | Fitzpatrick et al. | |
| 2005/0154560 A1 | 7/2005 | Fitzpatrick et al. | |
| 2012/0207350 A1 * | 8/2012 | Loos .................. | G06K 9/00778 382/103 |
| 2012/0269395 A1 * | 10/2012 | Coulter .............. | G06K 9/00369 382/103 |
| 2013/0027561 A1 * | 1/2013 | Lee .................... | G06Q 30/02 348/150 |

* cited by examiner

SYSTEM AND METHOD FOR VIDEO-BASED DETECTION OF DRIVE-OFFS AND WALK-OFFS IN VEHICULAR AND PEDESTRIAN QUEUES

This application claims priority to and the benefit of the filing date of U.S. Provisional Application No. 61/984,398, filed Apr. 25, 2014, which application is herein incorporated by reference in its entirety.

BACKGROUND

Advances and increased availability of surveillance technology over the past few decades have made it increasingly common to capture and store video footage of retail settings for the protection of companies, as well as for the security and protection of employees and customers. This data has also been of interest to retail markets for its potential for data-mining and estimating consumer behavior and experience to aid both real-time decision making and historical analysis. For some large companies, slight improvements in efficiency or customer experience can have a large financial impact.

Several efforts have been made at developing retail-setting applications for surveillance video beyond well-known security and safety applications. For example, one such application counts detected people and records the count according to the direction of movement of the people. In other applications, vision equipment is used to monitor queues, and/or groups of people within queues. Still other applications attempt to monitor various behaviors within a reception setting.

One industry that is particularly heavily data-driven is fast food restaurants. Accordingly, fast food companies and/or other restaurant businesses tend to have a strong interest in numerous customer and/or store qualities and metrics that affect customer experience, such as dining area cleanliness, table usage, queue lengths, experience time in-store and drive-thru, specific order timing, order accuracy, and customer response.

Of particular interest is the detection and diagnosing of abnormal events, particularly those related to customer volumes exceeding the capacity of a store. Such events include queue lengths and waiting times exceeding certain desired thresholds, which may in turn lead to customer dissatisfaction, customer drive-offs (in vehicular queues) and walk-offs (in pedestrian queues).

In addition to losing the sale to a particular customer, drive-offs or walk-offs from a queue for any reason complicates processing of orders and leads to mistakes and slowed performance, as well as potential losses in repeat business. There is currently no suitable automated solution to the detection of these events, since current solutions for operations analytics involve manual annotation often carried out by contractors; furthermore, other events of interest may not currently be detected at all.

INCORPORATION BY REFERENCE

The following references, the disclosures of which are incorporated by reference herein in their entireties are mentioned:

U.S. patent application Ser. No. 13/964,652, filed on Aug. 12, 2013, by Shreve et al., entitled "Heuristic-Based Approach for Automatic Payment Gesture Classification and Detection";

U.S. patent application Ser. No. 13/933,194, filed on Jul. 2, 2013, by Mongeon et al., and entitled "Queue Group Leader Identification";

U.S. patent application Ser. No. 13/973,330, filed on Aug. 22, 2013, by Bernal et al., and entitled "System and Method for Object Tracking and Timing Across Multiple Camera Views";

U.S. patent application Ser. No. 14/261,013, filed on Apr. 24, 2014, by Bernal et al., and entitled "System and Method for Video-Based Determination of Queue Configuration Parameters";

U.S. patent application Ser. No. 14/195,036, filed Mar. 3, 2014, by Li et al., and entitled "Method and Apparatus for Processing Image of Scene of Interest";

U.S. patent application Ser. No. 14/089,887, filed Nov. 26, 2013, by Bernal et al., and entitled "Method and System for Video-Based Vehicle Tracking Adaptable to Traffic Conditions";

U.S. patent application Ser. No. 14/078,765, filed Nov. 13, 2013, by Bernal et al., and entitled "System and Method for Using Apparent Size and Orientation of an Object to improve Video-Based Tracking in Regularized Environments";

U.S. patent application Ser. No. 14/068,503, filed Oct. 31, 2013, by Bulan et al., and entitled "Bus Lane Infraction Detection Method and System";

U.S. patent application Ser. No. 14/050,041, filed Oct. 9, 2013, by Bernal et al., and entitled "Video Based Method and System for Automated Side-by-Side Traffic Load Balancing";

U.S. patent application Ser. No. 14/017,360, filed Sep. 4, 2013, by Bernal et al. and entitled "Robust and Computationally Efficient Video-Based Object Tracking in Regularized Motion Environments";

U.S. Patent Application Publication No. 2014/0063263, published Mar. 6, 2014, by Bernal et al. and entitled "System and Method for Object Tracking and Timing Across Multiple Camera Views";

U.S. Patent Application Publication No. 2013/0106595, published May 2, 2013, by Loce et al., and entitled "Vehicle Reverse Detection Method and System via Video Acquisition and Processing";

U.S. Patent Application Publication No. 2013/0076913, published Mar. 28, 2013, by Xu et al., and entitled "System and Method for Object Identification and Tracking";

U.S. Patent Application Publication No. 2013/0058523, published Mar. 7, 2013, by Wu et al., and entitled "Unsupervised Parameter Settings for Object Tracking Algorithms";

U.S. Patent Application Publication No. 2009/0002489, published Jan. 1, 2009, by Yang et al., and entitled "Efficient Tracking Multiple Objects Through Occlusion";

Azari, M.; Seyfi, A.; Rezaie, A. H., "Real Time Multiple Object Tracking and Occlusion Reasoning Using Adaptive Kalman Filters", Machine Vision and Image Processing (MVIP), 2011, 7th Iranian, pages 1-5, Nov. 16-17, 2011.

BRIEF DESCRIPTION

In accordance with one aspect, a method for detecting queue member drive-offs/walk-offs from a queue comprises acquiring images of at least a portion of a queue region, determining a queue configuration within the images, analyzing the images to detect entry of a queue member into the queue, tracking a queue member detected in the queue as the queue member progresses within the queue, analyzing the images to detect if the queue member leaves the queue, and generating a drive-off/walk-off notification if a queue member leaves the queue prior to a queue terminating point.

The queue can be within a retail establishment. The method can include tracking a queue member after departure from the queue, and generating the drive-off/walk-off notification only when the queue member exits the retail establishment. The images of the retail establishment can include images of a drive-thru queue of the retail establishment. The method can include calculating the total time the detected customer is in the customer queue prior to leaving the customer queue. The queue member can include a vehicle, and the analyzing and tracking can include analyzing and tracking a vehicle on the premises of the retail establishment. The queue member can include a pedestrian, and the analyzing and tracking can include analyzing and tracking a pedestrian on the premises of the retail establishment. The determining a queue configuration can include manually identifying a queue region within the images. The determining a queue configuration can include automatically determining a queue region within the images. The generating a drive-off/walk-off notification can further include detecting the event of a tracked queue member previously inside a boundary of the determined queue region moving away from the boundary. The method can also include monitoring at least one queue entry point, the queue entry point being a dynamic location including a region adjacent to the current location of the most recently previously entered queue member. The steps can be performed in real time. The steps can be performed using at least one computer vision technique.

In accordance with another aspect, a system for detection of customer drive-off/walk-off from a customer queue comprises a device for monitoring customers including a memory in communication with a processor configured to acquire images of at least a portion of a queue region, determine a queue configuration within the images, analyze the images to detect entry of a queue member into the queue, track a queue member detected in the queue as the queue member progresses within the queue, analyze the images to detect if the queue member leaves the queue, and generate a drive-off/walk-off notification if a queue member leaves the queue prior to a queue terminating point.

The queue can be within a retail establishment or on grounds thereof. The system can be configured to track a queue member after departure from the queue, and generate the drive-off/walk-off notification only when the queue member exits the retail establishment or grounds thereof. The images of the retail establishment can include images of a drive-thru queue of the retail establishment. The system can be configured to calculate the total time the detected customer is in the customer queue prior to leaving the customer queue. The queue member can include a vehicle, and the system can be configured to analyze and track the vehicle on the premises of the retail establishment. The queue member can include a pedestrian, and the system can be configured to analyze and track a pedestrian on the premises of the retail establishment. The system can be configured to determine the queue configuration manually, the processor being configured to receive a user input indicative of said queue configuration. The system can be configured to determine the queue configuration automatically. The system can be configured to detect the event of a tracked queue member previously inside a boundary of the determined queue region moving away from the boundary, and generate the drive-off/walk-off notification in response thereto. The system can be configured to monitor at least one queue entry point, the queue entry point being a dynamic location including a region adjacent to the current location of the most recently previously entered queue member.

DETAILED DESCRIPTION

The present disclosure relates to a system and method for video-based detection of drive-offs and walk-offs in vehicular and pedestrian queues performed on an image or a video sequence. Herein, the terms "drive-off" and "walk-off" refer to a vehicular and pedestrian queue member, respectively, leaving the queue before reaching a queue terminating point such as an order point, a pay point, a kiosk, etc. Additionally, the terms "incoming frame" and/or "current frame" refer to a video frame that is currently being processed for foreground/motion detection, tracking, object recognition, and other video analytics and computer vision processes. This processing can be focused on a region of interest ("ROI") within the frame. The examples presented herein will refer to drive-thru and pedestrian retail queues, but the method and system taught are generally applicable to other types of queues and queue members.

Figure 1:
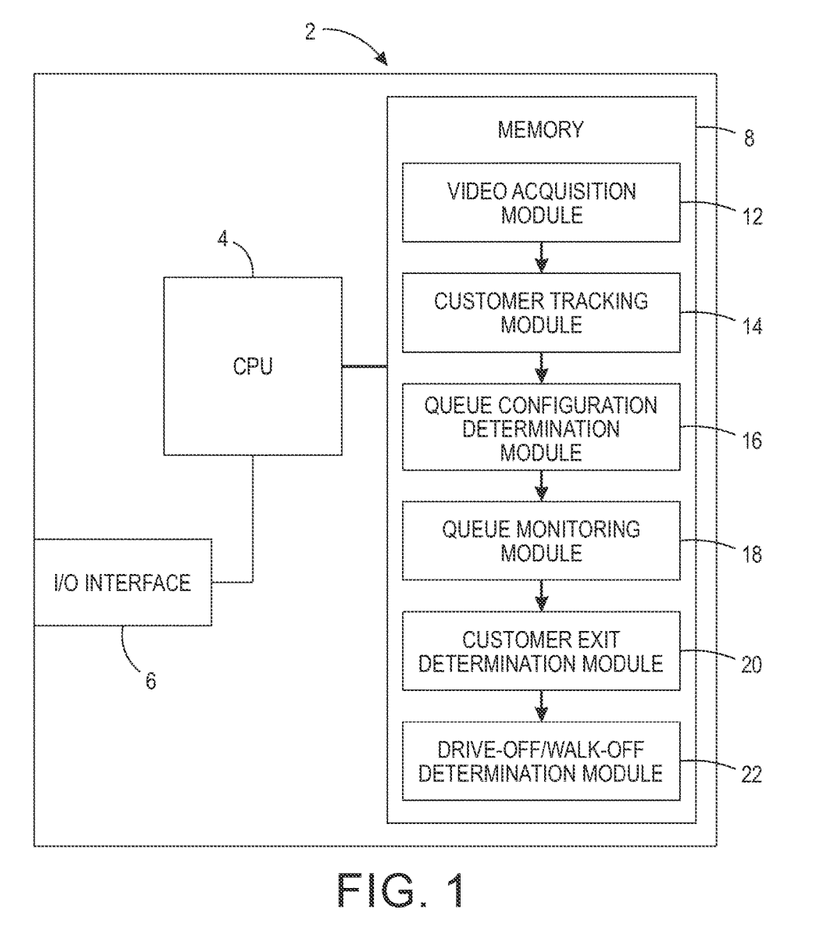
FIG. 1 is a block diagram of a tracking and drive-off/walk-off determination system according to an exemplary embodiment of the present disclosure.

With reference to FIG. 1, the present disclosure sets forth a system 2 for automated video-based detection of drive-offs and walk-offs in customer queues. The system 2 and method can be integrated with drive-thru and in-store customer tracking and timing systems, or can be provided as a stand-alone system. The system includes a CPU 4 that is adapted for controlling an analysis of video data received by the system 2, an I/O interface 6 such as a network interface for communicating with external devices. The interface 6 may include, for example, a modem, a router, a cable, and and/or Ethernet port, etc. The system 2 includes a memory 8 for storing various computer-executable instructions that can be carried out by the CPU 4. The memory 8 may represent any type of tangible computer readable medium such as random access memory (RAM), read only memory (ROM), magnetic disk or tape, optical disk, flash memory, or holographic memory. In one embodiment, the memory 8 comprises a combination of random access memory and read only memory. The CPU 4 can be variously embodied, such as by a single-core processor, a dual-core processor (or more generally by a multiple-core processor), a digital processor and cooperating math coprocessor, a digital controller, or the like. The CPU, in addition to controlling the operation of the system 2, executes instructions stored in memory 8 for performing the parts of the system and method outlined in FIG. 1. In some embodiments, the CPU 4 and memory 8 may be combined in a single chip. A wide variety of hardware can be utilized for implementing various aspects of the present disclosure, such hardware being well known to a person of ordinary skill in the art.

Additionally, system 2 includes the following modules comprised of one or more computer executable instructions:

a video acquisition module 12 which acquires video from the queue(s) of interest;

a customer tracking module 14 which uses the acquired video and video processing to track the location of customers in and around the queue area;

a queue configuration determination module 16 which determines the configuration of the queue through processing the acquired video, or, optionally, from manual input of the specification of the queue configuration;

a queue monitoring module 18 which detects the occurrence of an event corresponding to a customer previously in the queue leaving the queue before reaching the queue terminating point using input from the customer tracking module and the queue configuration determination module; and a customer exit determination module 20 which determines when a customer exits the retail store premises using input from the customer tracking module; and a drive-off/walk-off determination module 22 which issues an alert when a drive-off/walk-off is detected based on the outputs of the queue monitoring module and/or the customer exit detection module. In one embodiment, an alert is issued as soon as an event corresponding to a customer leaving the queue before reaching the queue terminating point is detected; in an alternative embodiment, the issuance of the alert may be made upon detection of the customer leaving the retail store premises according to the output of the customer exit detection module.

Further details of each module are set forth herein.

Video Acquisition Module 12

The video acquisition module 12 includes at least one, but possibly multiple video cameras that acquire video of the region of interest, including the queue being monitored and its surroundings. The type of cameras could be of any of a variety of surveillance cameras suitable for viewing the region of interest and operating at frame rates sufficient to view the queue events of interest, such as common RGB cameras that may also have a "night mode," and operate at 30 frame/sec, for example. The cameras can include near infrared (NIR) capabilities at the low-end portion of a near-infrared spectrum (700 nm-1000 nm). No specific requirements are needed regarding spatial or temporal resolutions.

The image source, in one embodiment, can include a surveillance camera with a video graphics array size that is about 1280 pixels wide and 720 pixels tall with a frame rate of thirty (30) or more frames per second. In one embodiment, the video acquisition module 12 can be a device adapted to relay and/or transmit the video captured by the camera to the customer tracking module 14. The video acquisition module can include a camera sensitive to visible light or having specific spectral sensitivities, a network of such cameras, a line-scan camera, a computer, a hard drive, or other image sensing and storage devices. In another embodiment, the video acquisition module 12 may acquire input from any suitable source, such as a workstation, a database, a memory storage device, such as a disk, or the like. The video acquisition module 12 is in communication with the CPU 4, and memory 8.

Figure 2:
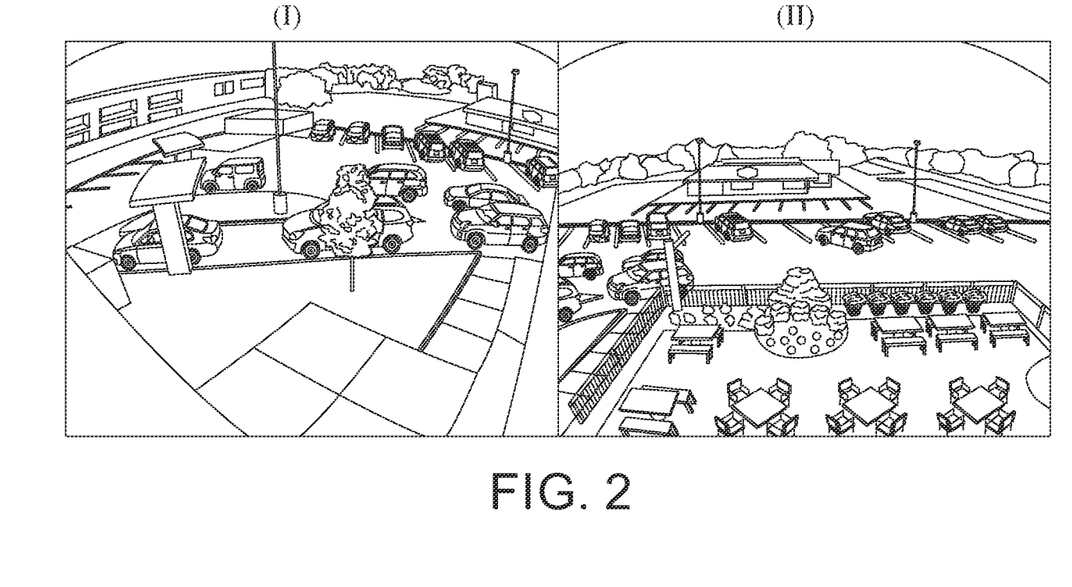
FIG. 2 shows an example scenario of a multi-lane queue being monitored by two cameras of a multi-camera network, where vehicles are supposed to form in a single file before the 'split point', and then split into two separate queues, one for each order point.

FIG. 2 shows two sample frames of videos captured with two cameras which include a vehicular multi-lane queue at a fast-food restaurant, and are used in the present disclosure. Note that both the queue area and its surrounding areas are being monitored. The surrounding area is monitored because, when a drive-off occurs, a vehicle usually moves from the queue area into an adjacent area.

Customer Tracking Module 14

Using the acquired video as input information, video processing is used to track customers in and around the queue area. A customer can be a person, or a vehicle in which a person is travelling, for example. The customer tracking module detects a customer the moment it enters the region being monitored and tracks its location in motion across the field of view of the camera(s). Customer detection is performed by detecting an initial instance of a subject entering the monitored premises. In one embodiment, a background estimation method that allows for foreground detection to be performed is used. According to this approach, a pixel-wise statistical model of historical pixel behavior is constructed for a predetermined detection area where subjects are expected to enter the field(s) of view of the camera(s), for instance in the form of a pixel-wise Gaussian Mixture Model (GMM). Other statistical models can be used, including running averages and medians, non-parametric models, and parametric models having different distributions.

The GMM describes statistically the historic behavior of the pixels in the highlighted area; for each new incoming frame, the pixel values in the area are compared to their respective GMM and a determination is made as to whether their values correspond to the observed history. If they don't, which happens, for example, when a car traverses the detection area, a foreground detection signal is triggered. When a foreground detection signal is triggered for a large enough number of pixels, a vehicle detection signal is triggered. Morphological operations usually accompany pixel-wise decisions in order to filter out noises and to fill holes in detections.

Alternative implementations of customer detection include motion detection algorithms that detect significant motion in the detection area. Motion detection is usually performed via temporal frame differencing and morphological filtering. This, in contrast to foreground detection, which also detects stationary foreground objects, motion detection only detects objects in motion at a speed determined by the frame rate of the video and the video acquisition geometry. In other embodiments, computer vision techniques for object recognition and localization can be used on still frames. These techniques typically entail a training stage where the appearance of multiple labeled sample objects in a given feature space (e.g., Harris Corners, SIFT, HOG, LBP, etc.) is fed to a classifier (e.g., support vector machine—SVM, neural network, decision tree, expectation-maximization—EM, k nearest neighbors—k-NN, other clustering algorithms, etc.) that is trained on the available feature representations of the labeled samples. The trained classifier is then applied to features extracted from image areas adjacent to the entrance points to the retail business premises from frames of interest and outputs the parameters of bounding boxes (e.g., location, width and height) surrounding the matching candidates. In one embodiment, the classifier can be trained on features of vehicles or pedestrians (positive samples) as well as features of asphalt, grass, windows, floors, etc. (negative features). Upon operation of the trained classifier, a classification score on an image test area of interest is issued indicating a matching score of the test area relative to the positive samples. A high matching score would indicate detection of a vehicle or a pedestrian.

Tracking algorithms including point- and global feature-based, silhouette/contour, and particle filter trackers can be used. In one embodiment, a cloud-point-based tracker is used that tracks sets of interest points per vehicle. The customer tracking module 14 outputs spatio-temporal information describing the location of the customers across the range of frames in which they are present within the field of view of the camera(s). Specifically, for each object being tracked, the local tracking module outputs its location in pixel coordinates and the corresponding frame number across the range of frames for which the object remains within the field of view of the camera(s). In the case where more than one camera is needed to cover the queue area, the customer tracking module is capable of tracking the customer across multiple cameras. Because the acquired video frame(s) is a projection of a three-dimensional space onto a two-dimensional plane, ambiguities can arise when the subjects are represented in the pixel domain (i.e., pixel coordinates). These ambiguities are introduced by perspective projection, which is intrinsic to video data acquired by a camera. In the embodiments where video data is acquired from more than one camera (each associated with its own coordinate system), apparent discontinuities in motion patterns can exist when a subject moves between the different coordinate systems. These discontinuities make it more difficult to interpret the data.

In one embodiment, these ambiguities can be resolved by performing a geometric transformation that maps pixel coordinates to real-world coordinates. Particularly in a case where multiple cameras cover the entire queue area, the coordinate systems of each individual camera may be mapped to a single, common coordinate system. For example, the spatial coordinates corresponding to the tracking data from a first camera can be mapped to the coordinate system of a second camera. In another embodiment, the spatial coordinates corresponding to the tracking data from multiple cameras can be mapped to an arbitrary common coordinate system.

Any existing camera calibration process can be used to perform the estimated geometric transformation. One approach is described in the disclosure of co-pending and commonly assigned U.S. application Ser. No. 13/868,267, entitled "Traffic Camera Calibration Update Utilizing Scene Analysis," filed Apr. 13, 2013 by, Wencheng Wu, et al., the content of which is totally incorporated herein by reference.

While calibrating a camera can require knowledge of the intrinsic parameters of the camera, the calibration described herein need not be exhaustive to eliminate ambiguities in the tracking information. For example, a magnification parameter may not need to be estimated.

Further details of tracking across multiple camera views are set forth in commonly-assigned U.S. patent application Ser. No. 13/973,330 filed on Aug. 22, 2013, entitled SYSTEM AND METHOD FOR OBJECT TRACKING AND TIMING ACROSS MULTIPLE CAMERA VIEWS, which application is incorporated by reference in its entirety.

Queue Configuration Determination Module 16

Figure 3:
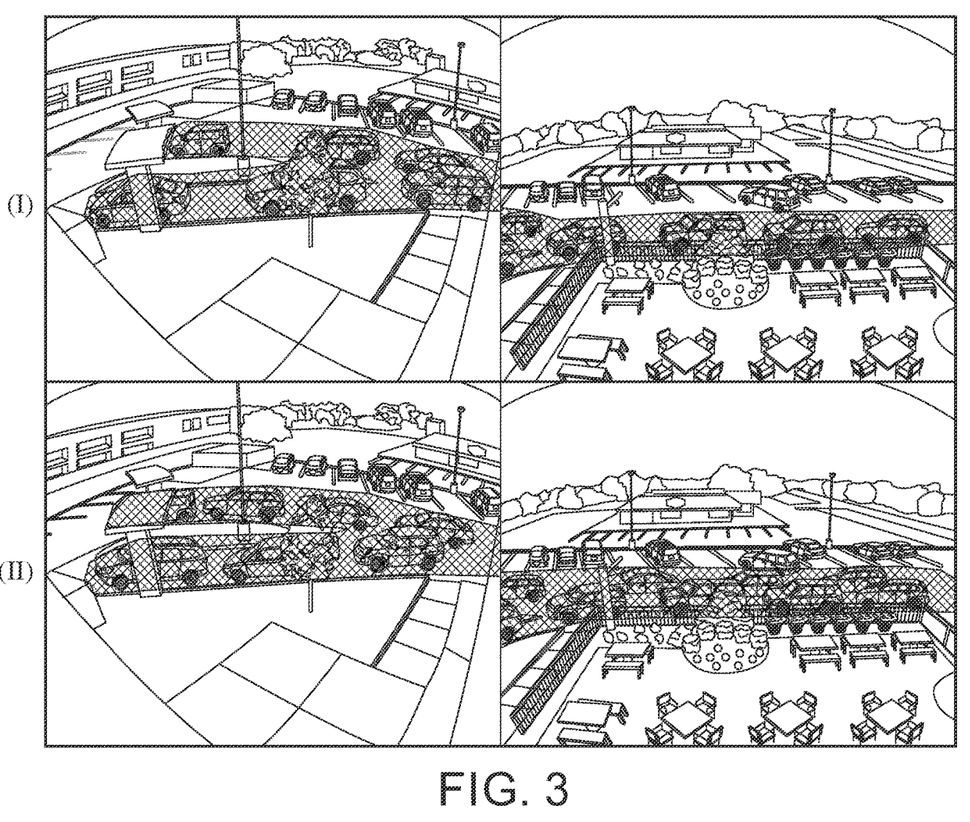
FIG. 3 shows two exemplary queue scenarios in a drive-thru setting, one where the queue forms as expected and one where, due to the customer volume, the separate queues form earlier than established.

Using the acquired video as input information, video processing is used to determine the queue configuration. The queue configuration determination module determines in real time the location within the video frame of the customers that are in the queue. This module accounts for shifting queue locations. That is, although queue areas are usually well demarked in restaurants and other drive-thru retail settings, customers may or may not adhere to the posted guidelines. In the vehicular queue depicted in FIG. 2, vehicles are supposed to form in a single file before the 'split point', and then split into two separate queues, one for each order point which constitutes a terminating point of the queue. These guidelines are not always respected as illustrated in FIG. 3, which shows two scenarios, one where the queue forms as expected (I) and one where, due to the customer volume, the separate queues form earlier than established (II). Walk-up queues can exhibit more irregular behavior than drive-thru queues due to pedestrian mobility and other social factors. In other situations, for example in supermarket or immigration queues, the configuration of the queue may be modified on the fly by queue supervisors in order to accommodate fluctuations in customer volume. The images in FIG. 3 show the outline (cross-hatched regions) of the queues localized manually. That is, the queue area is manually delineated, for example, during installation and setup of the system. An automatic method for queue configuration estimation is proposed in the accompanying co-pending and commonly assigned U.S. patent application Ser. No. 14/261,013, entitled "System and Method for Video-Based Determination of Queue Configuration", filed Apr. 24, 2014 by Edgar A. Bernal, et al., the content of which is totally incorporated herein by reference.

The queue configuration determination module 16 extracts queue-related parameters. Generally, the queue-related parameters can vary between applications. The parameters which the module 16 extracts can be based on their relevance to the task at hand. Examples of queue-related parameters include, but are not limited to, a split point location, queue length, queue width, any imbalance in side-by-side order point queues, queue outline/boundaries, and statistics of queue times/wait periods, etc.

In one contemplated embodiment, for example, the module 16 can extract the boundary of the queue configuration. Based on the estimated queue boundary, determinations as to whether a given subject forms part of a queue or leaves a queue before reaching the queue terminating point can be made.

One aspect of automatically detecting queue dynamics is that the data can aid businesses in making informed decisions aimed at improving customer throughput rates, whether in real-time or for the future. Similarly, histories of queue-related parameters, and their correlation with abnormal events, (such as vehicle drive-offs, drive-bys, drive-arounds at a drive-thru queue area, or walk-offs in a pedestrian queue) and other anomalous incidents can shed light into measures the business can take to avoid a reoccurrence of these undesired events.

There is no limitation made herein to the type of business or the subject (such as customers and/or vehicles) being monitored in the queue area. The embodiments contemplated herein are amenable to any application where subjects can wait in queues to reach a goods/service point. Non-limiting examples, for illustrative purposes only, include banks (indoor and drive-thru teller lanes), grocery and retail stores (check-out lanes), airports (security check points, ticketing kiosks, boarding areas and platforms), road routes (i.e., construction, detours, etc.), restaurants (such as fast food counters and drive-thrus), theaters, and the like, etc. The queue configuration and queue-related parameter information computed by the present disclosure can aid these applications.

There are several options in defining the queue configuration in retail locations where the queue configuration is known or assumed to be relatively spatially constrained. For example, the outline may be specified as input by a user of the system. Alternatively, the queue configuration may be determined at an early stage of deployment or start up and held constant or updated over times.

Queue Monitoring Module 18

The queue monitoring module 18 takes input from the customer tracking module 14 and the queue configuration determination module 16 and issues a notification when a customer previously in a queue leaves the queue before reaching the queue terminating point. This determination is performed, for example, by detecting the event of a tracked customer previously inside the boundaries of a queue configuration drifting away from the outline before reaching the queue terminating point. Once a customer reaches the queue terminating point, the customer is discarded as a drive-off/ walk-off candidate. In addition to purely spatial information, other types of data can be used to make the determination process more robust. For example, if the speed and the direction of motion of a customer previously in a queue are significantly different from that of customers still in the queue, then a notification can be issued.

Customer Exit Determination Module 20

The customer exit determination module 20 determines when a customer exits the retail store premises using input from the customer tracking module. The customer exit determination module 20 makes a decision based on the tracking information: as a trajectory is detected to enter or traverse the exit region, a notification of an exit event associated with the customer being tracked is issued.

The drive-off/walk-off determination module 22, in concert with the customer tracking module 14, the queue monitoring module 18 and the customer exit determination module 20, issues an alert when a drive-off or walk-off is detected. In one embodiment, an alert is issued as soon as an event corresponding to a customer leaving the queue before reaching the queue terminating point is detected; in an alternative embodiment, the issuance of the alert may be made upon detection of the customer leaving the retail store premises after leaving the queue before reaching the queue terminating point according to the output of the customer exit detection module.

In yet another embodiment, the drive-off/walk-off determination module can detect anomalous behavior in a queue through tracking of a customer, or more generally, a "queue member." In this general context, system 2 can detect late entries into a queue as well as early exits and lane changes from a queue. Detection of late entries can be detected by tracking persons or vehicles in the area surrounding a queue and entering the queue in locations other than an entry point. An entry point can include fixed spatial locations within a scene of interest, and the space preceding the last queue member to enter. This late entry of a queue member is sometimes colloquially known as "cutting in line." Late entry can significantly decrease customer satisfaction and may create a disruption to payment, order/goods delivery, or provided service. Detection of a late entry and subsequent alert of an employee, manager or official can enable correction of the sequence of serving the queue members or can lead to a warning or instruction to the late queue member to enter at the appropriate location.

Further, the entry point can include a location defined by a broader region where queues are forming. For instance, traffic lanes are often reduced by design or due to a temporary factor, such as construction or an accident. A majority of vehicles will move to the remaining lanes upon notification of the lane reduction by a sign or signal. Accidents, traffic slow-downs, and road rage can occur when vehicles attempt to enter very late in the queuing process for lane reduction. In such settings, a region significantly past the notification, but prior to the actual reduction can be defined as the entry point. This entry point can be static, such as a location midway or a fixed distance between the notification and the lane reduction. Optionally, it could be dynamic, determined by factors such as the location where average speed of queue members is reduced by a signification factor (e.g., 25%), or the queue member density of the lane that will remain is significantly higher than the queue member density in the lane that is being eliminated (e.g., 9/1 density difference). Detecting late entries in this setting can be used in long-term analysis on average queue entry behavior to better understand and design lane reduction. Or, detecting late entries can be used in individual events, for example, to issue citations reckless driving or determine fault of an accident.

In the exemplary embodiment, a network of cameras views vehicles in a drive-thru scenario around a building, such as a restaurant. In some implementations, a single camera can be sufficient to monitor the queue. Similarly, a single camera may be sufficient to monitor a particular region of the queue that may be more susceptible to drive-offs/walk-offs. Accordingly, the configuration of camera(s) can be customized depending on the specific implementation.

The exemplary system set forth herein performs video processing. A primary application is notification of queue drive-offs/walk-offs as they happen so that the cause and effects can be mitigated in real time. Hence, in one embodiment real-time processing is used so that alerts can be given within seconds of the event. An alternative embodiment utilizes aspects of the present disclosure for post-operation review, where an analyst or store manager can review information on the anomalies at a later time to understand store performance. In such an embodiment, the real-time processing is not needed.

In some applications, smart cameras may be used where the processing or a significant portion of the processing is performed within the camera. In other applications, the substantial processing may be performed by a computer that may be receiving information from one or more cameras.

Figure 4:
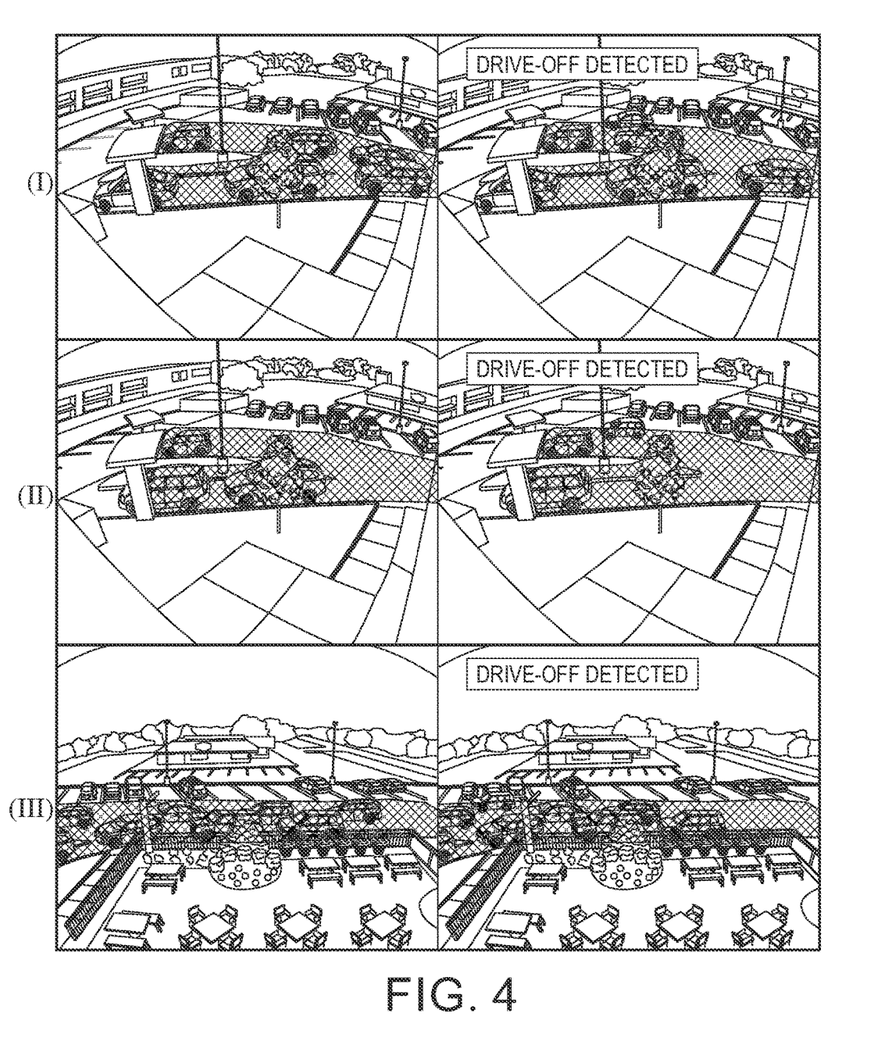
FIG. 4 shows three exemplary cases of automated drive-off detection, where the left/right column frames are images of the queue before/after the drive-off events.

It should be appreciated that customer drive-offs and walk-offs are inherently anomalous. FIG. 4 illustrates three different types of drive-offs detectable by the present disclosure for illustration purposes. As a tracker associated with a car leaves the detected queue area before reaching the queue termination point, a drive-off notification is issued. For more reliable drive-off notifications, additional drive-off cues based on speed and motion characteristics may be used. As mentioned, in alternative embodiments, the drive-off/ walk-off notification can be issued when a vehicle that was detected leaving the queue area before reaching the queue termination point is detected to exit the store premises.

Although the method is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for detecting queue member drive-offs/walk-offs from a queue in a shifting location comprising:
   acquiring images of at least a portion of a queue region using a plurality of cameras each having a different field of view including at least a portion of the queue region; and
   processing the images with a computer processor, the processing including iteratively:
   determining a queue configuration with a queue dynamics monitoring device comprising a queue area within the images, at least a portion of the queue area residing in the field of view of each of the plurality of cameras;
   analyzing the images to detect entry of a plurality of queue members into the queue area, the analyzing including monitoring at least one queue entry point, the queue entry point being a dynamic location including a region adjacent to a current location of a most recently previously entered queue member;
   tracking, within the images, the plurality of queue members detected in the queue area as the queue members progress within the queue area towards a queue terminating point;
   analyzing the images to detect if any of the queue members leave the queue area; and
   generating a drive-off/walk-off notification based on whether a queue member is detected leaving the queue area prior to reaching a queue terminating point;
   wherein the queue area is dynamic and shifts locations within the images; and
   wherein determining the queue configuration with the queue dynamics monitoring device further comprising:
   wherein the queue dynamics monitoring device detects at least one subject in an image and tracks its location across a series of images;
   in response to an occupancy in the queue area meeting a predetermined level, the queue dynamics monitoring device clusters sequences of points into at least one cluster across the series of images using the tracked location of the at least one subject to form at least one last trajectory;
   the queue dynamics monitoring device computing at least one Mahalanobis distance between a centroid of the at least one last trajectory and a centroid of a select trajectory,
       wherein the select trajectory is a set of the tracked locations corresponding to one subject, and
       wherein computing the at least one Mahalanobis distance, a covariance estimate is given by a sample covariance of the at least one last trajectory added to the at least one cluster;
   the queue dynamics monitoring device adding the select trajectory to a nearest cluster according to the at least one Mahalanobis distance computed by the queue dynamics monitoring device; and
   the queue dynamics monitoring device estimating the queue configuration by fitting one of a spline or manifold to the at least one cluster.

2. The method of claim 1, wherein the queue area is within a retail establishment.

3. The method of claim 2, further comprising tracking a queue member after departure from the queue area prior to reaching a queue termination point, and generating the drive-off/walk-off notification only when the queue member exits the retail establishment.

4. The method of claim 2, wherein the images of the retail establishment include images of a drive-thru queue of the retail establishment.

5. The method of claim 4, wherein at least one queue member includes a vehicle, and the analyzing and tracking includes analyzing and tracking the vehicle on the premises of the retail establishment.

6. The method of claim 2, wherein at least one queue member includes a pedestrian, and the analyzing and tracking includes analyzing and tracking the pedestrian on the premises of the retail establishment.

7. The method of claim 1, further comprising calculating a total time the detected subject is in the queue area prior to leaving the queue area.

8. The method of claim 1, wherein the determining a queue configuration includes manually identifying a queue region within the images.

9. The method of claim 1, wherein the generating a drive-off/walk-off notification further comprises detecting a tracked queue member previously inside a boundary of the queue area moving away from the boundary.

10. The method of claim 1, performed in real time using at least one computer vision technique.

11. The method of claim 1, wherein determining a queue configuration within the images includes determining a queue split point location.

12. A system for detection of customer drive-off/walk-off from a shifting customer queue, the system comprising a device for monitoring customers including a memory in communication with a processor configured to iteratively:
   acquire images of at least a portion of a queue region using a plurality of cameras each having a different field of view including at least a portion of the queue region;
   determine a queue configuration comprising a queue area within the images;
   analyze the images to detect entry of queue members into the queue area by monitoring at least one queue entry point, the queue entry point being a dynamic location including a region adjacent to the current location of a most recently previously entered queue member;
   track the queue members detected in the queue as the queue members progress within the queue area towards a queue terminating point;
   analyze the images to detect if a queue member leaves the queue area; and
   generate a drive-off/walk-off notification if a queue member is detected leaving the queue area prior to reaching a queue terminating point;
   wherein the queue area is dynamic and shifts locations within the images;
   wherein the processor is further configured to determine the queue configuration by:
   detecting at least one subject in an image and tracking its location across a series of images;
   in response to an occupancy in the queue area meeting a predetermined level, clustering sequences of points into a cluster across the series of images using the location of the at least one subject, the cluster including a last trajectory;

computing a Mahalanobis distance between a centroid of the last trajectory and a centroid of a select trajectory, wherein the select trajectory is a set of tracked locations corresponding to one subject, and wherein computing the Mahalanobis distance, a covariance estimate is given by a sample covariance of the last trajectory added to the cluster;

adding the select trajectory to a nearest cluster according to the computed distance; and estimating the queue configuration by fitting one of a spline or manifold to each cluster to identify the queue configuration.

13. The system of claim 12, wherein the queue area is within a retail establishment.

14. The system of claim 13, further configured to track a queue member after departure from the queue area prior to reaching a queue termination point, and generate the drive-off/walk-off notification only when the queue member exits the retail establishment.

15. The system of claim 13, wherein the images of the retail establishment include images of a drive-thru queue of the retail establishment.

16. The system of claim 13, wherein at least one queue member includes a vehicle, and the system is configured to analyze and track the vehicle on the premises of the retail establishment.

17. The system of claim 13, wherein at least one queue member includes a pedestrian, and the system is configured to analyze and track a pedestrian on the premises of the retail establishment.

18. The system of claim 12, further configured to calculate a total time a detected queue member is in the queue area prior to leaving the queue area.

19. The system of claim 12, further configured to determine the queue configuration manually, the processor configured to receive a user input indicative of said queue configuration.

20. The system of claim 12, further configured to determine the queue configuration automatically.

21. The system of claim 12, further comprising detecting a tracked queue member previously inside a boundary of the queue area moving away from the boundary, and generating the drive-off/walk-off notification in response thereto.

22. A system for detection of customer drive-off/walk-off from a shifting customer queue, the system comprising a device for monitoring customers including a memory in communication with a processor configured to iteratively:

acquire images of at least a portion of a queue region using a plurality of cameras each having a different field of view including at least a portion of the queue region;

determine a queue configuration comprising a queue area within the images;

analyze the images to detect entry of queue members into the queue area by monitoring at least one queue entry point, the queue entry point being a dynamic location including a region adjacent to the current location of a most recently previously entered queue member;

track the queue members detected in the queue as the queue members progress within the queue area towards a queue terminating point;

analyze the images to detect if a queue member leaves the queue area; and generate a drive-off/walk-off notification if a queue member is detected leaving the queue area prior to reaching a queue terminating point;

wherein the queue area is dynamic and shifts locations within the images;

wherein the processor is further configured to determine the queue configuration by:

detecting at least one subject in an image and tracking its location across a series of images;

in response to an occupancy in the queue area meeting a predetermined level, clustering sequences of points into a cluster across the series of images using the location of the at least one subject, the cluster including a last trajectory;

computing a Mahalanobis distance between a centroid of the last trajectory and a centroid of a select trajectory, wherein the select trajectory is a set of tracked locations corresponding to one subject, and wherein computing the Mahalanobis distance, a covariance estimate is given by a sample covariance of the last trajectory added to the cluster;

adding the select trajectory to a nearest cluster according to the computed distance; and estimating the queue configuration by fitting one of a spline or manifold to each cluster to identify the queue configuration.

\* \* \* \* \*